US005604264A

United States Patent [19]
McQuigg

[11] Patent Number: 5,604,264
[45] Date of Patent: Feb. 18, 1997

[54] POLYVINYLPYRIDINIUM ANION-EXCHANGERS FOR RECOVERY OF TECHNETIUM AND PLUTONIUM ANIONS

[75] Inventor: Donald W. McQuigg, Plainfield, Ind.

[73] Assignee: Reilly Industries, Inc., Indianapolis, Ind.

[21] Appl. No.: 415,622

[22] Filed: Apr. 3, 1995

[51] Int. Cl.[6] .................................................. B01J 39/18
[52] U.S. Cl. ........................... 521/38; 521/30; 521/33; 526/258; 526/265; 526/310; 526/336; 526/347.1
[58] Field of Search .................... 521/38, 30; 526/265

[56] References Cited

U.S. PATENT DOCUMENTS

| | | | |
|---|---|---|---|
| 2,623,013 | 9/1949 | D'Alelio | 521/38 |
| 2,683,124 | 9/1949 | D'Alelio | 521/38 |
| 2,732,350 | 1/1956 | Clarke | 521/38 |
| 2,739,948 | 3/1956 | D'Alelio | 521/38 |
| 3,086,840 | 4/1963 | Hillyer | 521/38 |
| 3,723,306 | 3/1973 | Bridgeford | 210/22 |
| 3,784,457 | 1/1974 | Mizutani et al. | 204/180 |
| 3,787,474 | 1/1974 | Daniels et al. . | |
| 3,936,429 | 2/1976 | Seoka et al. . | |
| 3,968,037 | 7/1976 | Morgan et al. | 210/47 |
| 3,972,787 | 8/1976 | Nobel et al. | 204/47 |
| 3,983,097 | 9/1976 | Okubo et al. | 526/49 |
| 4,042,496 | 8/1977 | Tsushima et al. | 210/23 |
| 4,097,420 | 6/1978 | Mikes et al. . | |
| 4,112,045 | 9/1978 | Seko et al. | 423/7 |
| 4,154,615 | 5/1979 | Sato et al. | 96/77 |
| 4,177,142 | 12/1979 | Halbfoster | 210/75 |
| 4,183,732 | 1/1980 | Vartanian et al. | 44/62 |
| 4,190,532 | 2/1980 | Halbfoster | 210/75 |
| 4,212,764 | 7/1980 | Quinlan | 252/392 |
| 4,221,871 | 9/1980 | Meitzner | 521/29 |
| 4,224,415 | 9/1980 | Meitzner et al. | 521/38 |
| 4,238,334 | 12/1980 | Halbfoster | 210/679 |
| 4,246,355 | 1/1981 | Bolto et al. | 521/38 |
| 4,256,840 | 3/1981 | Meitzner et al. | 521/33 |
| 4,297,220 | 10/1981 | Meitzner et al. | 210/690 |
| 4,306,080 | 12/1981 | Haase et al. | 564/197 |
| 4,382,124 | 5/1983 | Meitzner et al. | 521/38 |
| 4,469,834 | 9/1984 | Shearer et al. | 524/193 |
| 4,469,873 | 9/1984 | Nieh | 546/344 |
| 4,477,596 | 10/1984 | Fujimoto | 521/25 |
| 4,486,313 | 12/1984 | Meitzner et al. | 210/681 |
| 4,501,826 | 2/1985 | Meitzner et al. | 521/29 |
| 4,710,374 | 12/1987 | Grollier et al. | 424/61 |
| 4,715,850 | 12/1987 | Tran | 604/82 |
| 4,773,970 | 9/1988 | Purbrick et al. | 204/1 T |
| 4,801,386 | 1/1989 | Sugimori et al. | 210/680 |
| 4,802,985 | 2/1989 | Sugimori et al. | 210/502.1 |
| 5,034,330 | 7/1991 | Yamori et al. | 435/288 |
| 5,176,834 | 1/1993 | Christian et al. | 210/639 |
| 5,188,766 | 2/1993 | Eiffler | 252/500 |
| 5,300,228 | 4/1994 | Sugaya et al. | 210/638 |
| 5,378,381 | 1/1995 | Takahashi et al. | 252/62.2 |

FOREIGN PATENT DOCUMENTS 0375350  6/1990  European Pat. Off. .

OTHER PUBLICATIONS

Greig, J. A. and Sherrington, D. C., "Molecular Sieve Behaviour In Polymeric Reagents", *Polymer*, vol. 19, pp. 163–172 (1978).

Hassanein, M., "Preparation And Synthetic Application Of Poly(4–Vinylpyridine) Based Resins With Bound Nucleophilic Reagents", *Eur. Polym. J.*, vol. 28, No. 9, pp. 1073–1076 (1992).

Ihara, Y., "Adsorption Of Sodium Alkyl Sulfates On Ion Exchange Resins Derived From 4–Vinylpyridine", *J. Appl. Poly. Sci.*, vol. 33, pp. 3087–3090 (1987).

Metelko, M. and Zupan, M., "Site–Site Interactions In A Polymer Matrix. The Effect Of Reaction Conditions On The Functionalization Of Pyridine Rings In Crosslinked Poly(Styrene–4–Vinylpyridine) With 1,6–Dibromohexane", *J. Macromol. Sci–Chem.*, vol. A26, No. 4, pp. 715–726 (1989).

Sata, T. and Yamamoto, Y., "Modification Of Transport Properties Of Ion–Exchange Membranes VIII. Changes In Properties Of Anion Exchange Membranes On Introduction Of Hydrophobic Groups", *J. Poly Sci.: Part B: Poly. Physics*, vol. 27, pp. 2229–2241 (1989).

Sperling, L. H., Forlenza, V. A. and Manson, J. A., "Interpenetrating Polymer Networks As Piezodialysis Membranes", *Polym. Letters Ed.*, vol. 13, pp. 713–716 (1975).

Zajc, B. and Zupan, M., "The Effect Of Polymer–Supported Reagent Structure On Bromination Of Organic Molecules", *Tetrahedron*, vol. 46, No, 17, pp. 6161–6166 (1990).

*Primary Examiner*—Fred Zitomer
*Attorney, Agent, or Firm*—Woodard, Emhardt, Naughton, Moriarty & McNett

[57] ABSTRACT

Described are anion-exchange materials having extraordinarily high affinity for plutonium anions such as plutonium (IV), and technetium anions such as pertechnetate. Preferred inventive resins are highly divinylbenzene cross-linked polyvinylpyridine resins exhibiting a macroreticular bead form, which have been quaternized to contain a substantial amount of 1-alkyl-pyridinium groups wherein the alkyl group has 4 to 8 carbon atoms. The inventive resins can be used in preferred processes for recovering plutonium and/or technetium anions from aqueous mediums, for example nuclear waste streams or groundwater related to civilian or defense-related nuclear operations.

18 Claims, No Drawings

POLYVINYLPYRIDINIUM ANION-EXCHANGERS FOR RECOVERY OF TECHNETIUM AND PLUTONIUM ANIONS

BACKGROUND

The present invention relates generally to anion-exchangers for recovering metal values from aqueous solutions, and in particular to crosslinked polyvinylpyridinium anion-exchange resins and their use in recovering anions of radioactive elements such as technetium and plutonium.

As further background, as a consequence of the development and utilization of nuclear fission technologies, large amounts of civilian- and defense-related radioactive nuclear wastes have been and continue to be produced. While some nuclear wastes are handled simply in controlled geological repositories, other waste streams are reprocessed to remove or recover radioactive isotopes. For example, technetium$^{99}$ (Tc$^{99}$) is a radioactive material which is a fission product of uranium or plutonium used for nuclear fuel. In most aqueous environments, Tc$^{99}$ forms a stable anion, known as pertechnetate (TcO$_4^-$). Pertechnetate is soluble in basic, neutral and acidic aqueous mediums and thus very mobile in a variety of environments. Accordingly, it is critically important in nuclear waste reprocessing strategies, and- in nuclear site remediation, to deal with the mobile pertechnetate ion.

Plutonium also forms stable ions which are desirably recovered in the reprocessing of nuclear waste streams or in the recovery of plutonium from impure scrap materials from plutonium facilities. To date, the two classical methods for recovering technetium and plutonium values have been liquid-liquid extraction and liquid-solid ion-exchange processes. In the field of ion-exchange, one common practice has been to purify plutonium by anionic exchange in nitric acid. As for technetium, the pertechnetate ion exists in acidic, neutral and basic mediums, and thus its associated ion-exchange purifications occur from a wide range of feed materials.

While these ion-exchange processes have generally proven to be operable, ion-exchange resins having greater affinity for ions of plutonium and technetium are needed. The present invention addresses this need.

SUMMARY OF THE INVENTION

The applicant has prepared anion-exchange materials which exhibit extraordinarily high affinity for anions of plutonium and technetium, enabling improved processes for separating these anions from solutions such as those generated during nuclear waste processing. In accordance with the present invention, these anion-exchange materials comprise copolymers of divinylbenzene and vinylpyridine, which contain at least 15% by weight divinylbenzene (w/w relative to vinylpyridine) to provide an effective crosslink density and advantageous physical properties, and which have had a substantial amount of their pyridyl groups converted to 1-(C$_4$-C$_8$alkyl)-pyridinium. It has been discovered that the use of relatively longer 1-alkyl groups such as butyl, pentyl, hexyl, heptyl and octyl, provides pyridinium resins with unexpectedly improved affinity for anions of plutonium and technetium as compared to pyridinium resins bearing 1-methyl groups. Thus, provided by the present invention are preferred, highly crosslinked bead-form anion exchange resins having substantial pendant 1-alkyl-pyridinium groups, wherein the 1-alkyl groups are branched or unbranched and have 4 to about 8 carbon atoms. Especially preferred resins of the invention are provided wherein the 1-alkyl groups have from 4 to 6 carbon atoms.

These anion exchange materials can be prepared by a preferred process which involves post-functionalizing a bead-form copolymer of divinylbenzene and vinylpyridine. For example, the post-functionalization can include a process in which a reaction medium is formed containing the copolymer slurried in an organic solvent along with an alkylating agent, R-L, wherein R is a branched or unbranched alkyl group having 4 to 8 carbon atoms and L is a leaving group of sufficient strength to lead to the quaternization of pyridine nitrogens by the alkylating agent. For example, L is preferably a halide or an alkyl or aryl sulfonate group. The reaction medium is heated to a temperature and for a period of time sufficient to substantially alkylate, or quaternize, the pendant pyridinyl groups of the polymer. In this regard as used here and throughout this document, "substantially quaternized" is intended to mean that at least about 20 mole percent of the pyridinyl groups of the polymer material (based on the amount of vinylpyridine included in the resin) are quaternized.

The strong-base anion-exchange resins of the invention are useful in a broad range of anion-exchange processes for recovering technetium and/or plutonium values. For example, they can be used in the recovery of technetium values as pertechnetate from nuclear waste tank materials or in groundwater treatment operations. In addition, the anion-exchangers of the invention can be used in the purification of Pu as Pu(IV) in nitric acid anion-exchange processes. In these methods, the inventive materials provide high affinity and good sorption kinetics for technetium and plutonium anions, for rapid and efficient loading of the resin. These and other embodiments, objects and advantages of the present invention will be readily apparent from the following description.

DESCRIPTION OF THE PREFERRED EMBODIMENT

For the purpose of promoting an understanding of the principles of the invention, reference will now be made to certain preferred embodiments thereof and specific language will be used to describe the same. It will nevertheless be understood that no limitation of the scope of the invention is thereby intended, such alterations, further modifications and applications of the principles of the invention as described herein being contemplated as would normally occur to one skilled in the art to which the invention relates.

As indicated above, the present invention provides strong base anion-exchange resins having extraordinarily high affinity for plutonium and technetium anions. The preferred anion-exchange resins comprise highly (15%+) crosslinked bead-form copolymers which contain substantial pendant 1-(C$_4$–C$_8$ alkyl)-pyridinium groups. The preferred resins will thus bear substantial repeating units of the formula (I):

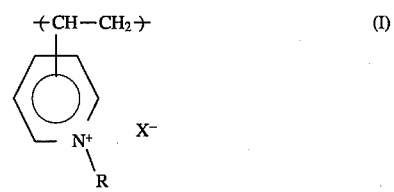

wherein R is a branched or unbranched C$_4$ to C$_8$ alkyl group, and X$^-$ is an anion. In this regard, preferred resins of the invention will be at least about 20% by weight comprised of repeating units of formula (I), typically in the range of about 20% to about 80% by weight, in order to provide an effective number of anion-exchange sites for advantageous separation of technetium and/or plutonium anions from aqueous solutions.

Representative groups R thus include branched or unbranched butyl, pentyl, hexyl, heptyl or octyl groups. Representative groups $X^-$ include ions typically resulting from the alkylating agent, for instance halides (including chloride, bromide, iodide and fluoride) or alkyl or aryl sulfonate groups of the formula $R^1SO_3^-$ wherein $R^1$ is an alkyl or aryl group, typically having from 1 to 20 carbon atoms. Groups $X^-$ may also represent counterions of strong acids which have been used to displace the original anion of the formed quaternary pyridinyl group, for example nitrate or sulfate ions. It will be understood that the anion X- may be varied widely to facilitate the use of the inventive resins in specific situations. For example, when the resin is to be used in an anion exchange process in nitric acid for the recovery of plutonium, it will be preferred to pretreat the resin with nitric acid to put it in the nitrate form. These and other modifications of the anion $X^-$ will readily occur to those skilled in the pertinent chemical field.

In especially preferred resins of the invention, the quaternizing alkyl group R will have 4 to 6 carbon atoms. The resultant resins exhibit high affinity and advantageous sorption kinetics for plutonium and technetium anions, and also good wetability with aqueous solutions, a highly important factor in the conduct of the target aqueous anion-exchange processes.

It will be understood that in preferred resins wherein not all of the pyridinyl groups present are quaternized to form 1-alkyl-pyridinium groups, the resins will also include repeating units of the formula (II):

and/or acid salt forms of the repeating unit of formula (II), for example which would occur upon treating the resins with a strong acid such as nitric acid or sulfuric acid, as discussed above.

In the preferred inventive resins the mole ratio of repeating units (I) to repeating units (II) will be at least about 1:4 and typically will be in the range of about 1:4 to about 19:1. Stated another way, typically, about 20 mole % to about 95 mole % of the pyridinyl repeating units in the resin will be quaternized.

As to the preparation of inventive resins, this preferably begins with the preparation of a highly divinylbenzene-crosslinked, free base form polyvinylpyridine polymer, for example using procedures as generally described in U.S. Pat. No. 4,221,871. Poly 2- or 4-vinylpyridine polymers are preferred, although alkyl-substituted vinylpyridine polymers, for example poly-2-methyl-5vinylpyridine polymers, are also suitable. The vinylpyridine monomer used to prepare resins of the invention is preferably of relatively high purity, for example at least about 90% pure. The charge of vinylpyridine to the copolymerization will be substantial, in order to provide substantial pendant pyridine groups and an effective level of functionality to the copolymer. Preferably, the copolymer is at least about 50% by weight comprised of vinylpyridine, often falling in the range of 50% to 85% by weight vinylpyridine.

The preferred divinylbenzene crosslinker used in the invention is also desirably of high purity, for example about 80% or more pure. The charge of divinylbenzene to the copolymerization will typically be in the range of 15% to 50% weight to weight (w/w) relative to the vinylpyridine charged. Particularly advantageous copolymers result from the use of about 20% to about 30% divinylbenzene, most preferably about 25% (w/w relative to vinylpyridine).

Preferred resins of the invention are bead-form gel or macroreticular resins, with a mesh size in the range of about 20 to 80 mesh, more preferably about 30 to about 60 mesh. Bead form macroreticular resins are most preferred.

Suitable copolymer resin starting materials for use in the invention include products known as REILLEX™ 425 and REILLEX™ HP resins, commercially available from Reilly Industries, Inc. of Indianapolis, Ind., U.S.A. These materials are 25% divinylbenzene-crosslinked poly-4-vinylpyridine resins exhibiting a macroreticular bead form. These REILLEX™ resins are highly thermally stable, for example at least up to temperatures of about 200° C. As well, these REILLEX™ resins demonstrate substantial stability against chemical or mechanical breakdown when subjected to ionizing radiation such as that typical of $Tc^{99}$ or $Pu^{239}$ recovery or clean-up operations.

In addition to vinylpyridine and divinylbenzene, copolymers of the invention may also include minor amounts of other comonomers such as styrene, but typically in amounts less than about 10% w/w relative to vinylpyridine.

The alkylating agent used in the invention will generally be of the formula R-L wherein L is a leaving group effective to confer upon the alkylating agent the ability to alkylate pyridine nitrogens. L will usually be a halogen or an alkyl or aryl sulfonate group as discussed above. With regard to halogens, those other than iodine, especially chlorine and bromine, are preferred. It has been found that iodide resultant of quaternizations with alkyl iodides is difficult to remove from the formed anion-exchange resins, for example when converting the resins to another form such as the nitrate form.

In the quaternization process, the alkylating agent is contacted with the resin in organic solvent system, e.g. a polar organic solvent such as dimethyl sulfoxide (DMSO) or an alcohol, especially lower ($C_1$–$C_4$) alcohols such as methanol and ethanol. It will be understood that the solvent should be compatible with the resin and the alkylating agent, and should be readily removable (e.g. rinsable or dryable) from the resin after completion of the reaction. The quaternization reactions can be performed at atmospheric or superatmospheric pressures. When it is desired to obtain a high level of quaternization, the reaction will typically be conducted at superatmospheric pressures. For example, the reaction medium containing the solvent, the resin and the alkylating agent can be formed in a closed reactor such as an autoclave, and the reaction mixture can then be heated and reacted at the autogenous pressure of the reaction system.

The quaternization reaction will be carried out at a temperature and for a period of time sufficient to quaternize a substantial amount of the pyridinyl groups in the polymer. In preferred processes and resins, about 40 mole % to about 95 mole % of the pyridinyl repeating units will be quaternized, or converted to the 1-alkyl-pyridinium form. Given the teachings herein, the extent of quaternization will be a parameter readily controlled by those skilled in the art to optimize the performance of the inventive resins in a given application.

In some instances, as a further preparative step or in situ in a use environment, the initially-prepared product will be treated to replace the anions resulting from the leaving groups (L⁻) with another anion suited to or resultant of an end use of the resins. This treatment may, for example, involve contacting the resin with a strong, inorganic acid such as nitric acid or sulfuric acid, to introduce nitrate or sulfate groups, respectively. It will be well understood that in such operations, some or all of the free base form pyridine groups remaining in the resin will be converted to their protonated, acid salt form. Thus, preferred resins of the invention may contain free base and/or acid salt form pyridinyl groups in addition to the substantial quaternary salt form pyridinyl groups.

As to the use of the inventive resins, the manipulative steps of the anion-exchange processes for the recovery of plutonium and technetium anions can be performed in a conventional fashion. For example, in nitric acid anion exchange for plutonium recovery, the nitric acid solution containing PU(IV) can be passed through a column containing the inventive anion-exchange resin, to selectively sorb Pu(IV) to the resin. Similarly with regard to technetium, solutions containing pertechnetate, including for example groundwater or neutral, acidified or basified nuclear waste reprocessing solutions, can be passed through such a column to selectively sorb pertechnetate to the inventive resins. The thus-bound plutonium or technetium can then be eluted from the resins using conventional techniques, or, alternatively, the resin can serve as a solid fixation device which is transferred to a geologic repository, or fed to a technetium recovery process in which the resin is destroyed (e.g. incinerated) while recovering the technetium values.

For the purposes of promoting a further understanding of the invention and its principles, the following specific Examples are provided. It will be understood that these Examples are illustrative and not limiting in nature. In these Examples, the chloride exchange capacities were determined by saturating a known quantity of resin with a solution containing chloride ion, rinsing the column of excess chloride solution, displacing the chloride ion with excess sulfate ion, collecting the effluent containing the chloride and determining, using standard methods, the quantity of chloride ion initially adsorbed the then displaced from the resin. The mole % quaternizations of the resins were determined by the ratio of the chloride exchange capacity in milliequivalents per gram (meq/g) dry resin to the pyridine function (meq/g) based on the vinylpyridine portion of the total monomers used to prepare the crosslinked polyvinylpyridine.

EXAMPLE 1

Preparation of 1-n-Butyl Poly-4-Vinylpyridinium Chloride, Crosslinked 150 g of a bead-form, 25% crosslinked poly-4-vinylpyridine macroreticular resin (REILLEX™ HP resin) were first dried and then slurried with dimethyl sulfoxide (1L) and allowed to soak overnight. 1-Chlorobutane (191 g) was added with heating and stirring during about one and one-half hours. Heating and stirring were continued under reflux conditions for about 120 hours at between 85° to 110° C. The slurry was cooled and filtered and the product washed with several portions of methanol and dried. The product was 43% quaternized and exhibited a chloride exchange capacity of 2.22 meq/g dry resin.

EXAMPLE 2

Preparation of 1-n-Hexyl Poly-4-Vinylpyridinium Chloride, Crosslinked 150 g of REILLEX™ HP resin were dried and slurried with dimethyl sulfoxide (1L) as in Example 1. 1-Chlorohexane (248 g) was added with heating and stirring during about 2 hours. Heating and stirring were continued under reflux conditions for about 94 hours at 100°–110° C. The slurry was cooled, filtered, and the product washed with several portions of methanol and dried. The product was 45% quaternized, exhibiting a chloride exchange capacity of 2.15 meq/g dry resin.

EXAMPLE 3

Preparation of 1-n-Octyl Poly-4-Vinylpyridinium Chloride, Crosslinked 150g of REILLEX™ HP resin were dried and slurried in dimethyl sulfoxide (1L) as in Example 1. The slurry was heated with stirring. The addition of 1-chlorooctane (307 g) was begun when the slurry's temperature had reached 80° C. and completed two and one-half hours later when the slurry's temperature had reached 95° C. The slurry's temperature was increased and maintained at 95°–110° C. under reflux condition with continued stirring for about 94 hours. The slurry was cooled and filtered and the product washed with several portions of methanol and dried. The product exhibited a chloride exchange capacity of 2.44 meq/g dry resin. 59 mole % of the pyridyl groups of the polymer had been quaternized.

EXAMPLE 4

Preparation of 1-n-Butyl Poly-4-Vinylpyridinium Chloride, Crosslinked

Water-wet REILLEX™ HP resin (150 g) was slurried with about 200 mL of methanol and, after about 30 minutes, the liquid portion was decanted. The procedure was repeated with an additional 200 mL portion of methanol. The resulting methanol-wet polymer, 200 mL of fresh methanol, and 137 g of n-butyl chloride were added to a TEFLON® polytetrafluoroethylene-lined autoclave and heated to 115° C. for 87 hours under autogenous pressure. The autoclave and its contents were cooled, the autoclave vented and the reaction mixture removed. The slurry was filtered and rinsed with additional methanol. The resulting product was found to be 89% quaternized, and to have a chloride exchange capacity of 3.75 meq/g dry resin.

EXAMPLE 5

Preparation of 1-Isobutyl Poly-4-Vinylpyridinium Chloride, Crosslinked

Water-wet REILLEX™ HP resin (150 g) was slurried with about 200 mL of methanol and, after about 30 minutes, the liquid portion was decanted. The procedure was repeated with an additional 200 mL portion of methanol. The resulting methanol-wet polymer, 200 mL of fresh methanol, and 103 g of isobutyl chloride were added to a TEFLON® polytetrafluoroethylene-lined autoclave and heated to 100° C. for 68 hours under autogenous pressure. The autoclave and its contents were cooled, the autoclave vented and a small sample of the reaction mixture was removed for analysis. An additional 34.3 g of isobutyl chloride were added to the slurry and the reaction mixture again heated to 100° C. for 68 hours. The autoclave and its contents were cooled, the autoclave vented, and the resulting reaction mixture removed. The slurry was filtered and rinsed with additional methanol and a portion of the polymer dried. The resulting sample was found to be about 45% quaternized, exhibiting a chloride exchange capacity of 2.40 meq/g dry resin.

EXAMPLE 6

Analysis of Resins for Affinity for Plutonium Anions

The distribution coefficients (Kd) of Pu(IV) from nitric acid solutions onto the resins prepared in Examples 1–5 were measured generally as previously described by S. F. Marsh, "Improved Recovery and Purification of Plutonium at Los Alamos Using Macroporous Anion Exchange Resin," Los Alamos National Laboratory Report LA 10906 (May 1987), and compared to that of REILLEX™ HPQ resin, a commercially available approximately 60–70% methyl quat of REILLEX™ HP resin (the material used in this study assayed at 62% quaternization). Thus, a solution containing Pu(IV) was prepared having an initial Pu concentration of 3 g/L. Small scale dynamic contacts between resin and plutonium solutions were effected for the contact periods given in Table 1, on a wrist-action shaker. Measured portions of the aqueous Pu(IV) solutions were removed after each contact period for gamma spectrometric assay. The 129 keV gamma-ray peak of $Pu^{239}$ was measured in all aqueous portions, both before and after contact with the resin. The difference between these two measurements represented the quantity of Pu(IV) sorbed onto the resin. The results of this testing are set forth in Tables 1 and 2, which set forth the Kd values (mL/g, Table 1; mL/meq alkyl, Table 2) for the various resins at the given contact times and $HNO_3$ concentrations. These results show the superior affinity for Pu(IV) possessed by the resins of the invention, which have relatively longer-chain alkyl groups ($C_4$–$C_8$) as compared to the REILLEX™ 425 HPQ material. In addition, the inventive resins demonstrated good sorption kinetics for Pu(IV), leading to advantageous, relatively rapid loading of the resins.

TABLE 1

| [$HNO_3$] | Contact Time (hr) | Reillex ™ HPQ methyl | Ex. 1 butyl | Ex. 2 hexyl | Ex. 3 octyl | Ex. 4 butyl | Ex. 5 i-butyl |
|---|---|---|---|---|---|---|---|
| 1 M | 0.5 | 6.7 | 17 | 23 | 22 | 20 | 9.6 |
|  | 2 | 7.1 | 19 | 26 | 16 | 21 | 10 |
|  | 6 | 6.8 | 19 | 27 | 19 | 22 | 11 |
| 3 M | 0.5 | 69 | 108 | 104 | 42 | 122 | 65 |
|  | 2 | 97 | 193 | 250 | 131 | 240 | 105 |
|  | 6 | 100 | 209 | 306 | 200 | 285 | 117 |
| 5 M | 0.5 | 233 | 232 | 165 | 85 | 254 | 188 |
|  | 2 | 412 | 561 | 703 | 303 | 868 | 440 |
|  | 6 | 372 | 677 | 1184 | 855 | 915 | 435 |
| 7 M | 0.5 | 490 | 328 | 281 | 164 | 453 | 262 |
|  | 2 | 850 | 878 | 1339 | 960 | 1378 | 763 |
|  | 6 | 683 | 1488 | 2349 | 2251 | 1578 | 888 |
| 9 M | 0.5 | 378 | 343 | 337 | 258 | 497 | 284 |
|  | 2 | 1164 | 1088 | 1177 | 974 | 1616 | 919 |
|  | 6 | 1517 | 1503 | 2026 | 1683 | 2243 | 1255 |

TABLE 2

| [$HNO_3$] | Contact Time (hr) | Reillex ™ HPQ methyl | Ex. 1 butyl | Ex. 2 hexyl | Ex. 3 octyl | Ex. 4 butyl | Ex. 5 i-butyl |
|---|---|---|---|---|---|---|---|
| 1 M | 0.5 | 2.2 | 8.4 | 11.6 | 4.9 | 5.6 | 4.4 |
|  | 2 | 2.3 | 9.4 | 13 | 7.1 | 5.9 | 4.6 |
|  | 6 | 2.2 | 9.4 | 14 | 8.5 | 6.2 | 5.0 |
| 3 M | 0.5 | 23 | 53 | 53 | 19 | 34 | 30 |
|  | 2 | 32 | 95 | 126 | 58 | 67 | 48 |
|  | 6 | 33 | 103 | 155 | 89 | 80 | 53 |
| 5 M | 0.5 | 77 | 114 | 83 | 38 | 71 | 85 |
|  | 2 | 136 | 276 | 355 | 135 | 244 | 200 |
|  | 6 | 123 | 334 | 598 | 382 | 257 | 198 |
| 7 M | 0.5 | 162 | 162 | 142 | 73 | 127 | 119 |
|  | 2 | 281 | 433 | 676 | 429 | 387 | 347 |
|  | 6 | 225 | 733 | 1186 | 1005 | 443 | 404 |
| 9 M | 0.5 | 125 | 169 | 170 | 115 | 140 | 129 |
|  | 2 | 384 | 536 | 594 | 435 | 454 | 418 |
|  | 6 | 501 | 740 | 1023 | 751 | 630 | 570 |

EXAMPLE 7

Analysis of Resins for Affinity for Pertechnetate Ions

The inventive resins of Examples 1–5 were assayed for affinity for pertechnetate ions as compared to the REILLEX™ HPQ resin, using dynamic contact procedures generally corresponding to those in Example 6. The test solutions were alkaline simulant solutions for Hanford Waste Tank 101-SY (containing EDTA) in Richland, Wash. The results, set forth in Table 3 (Kd, mL/meq alkyl), demonstrate the unexpectedly superior affinity of the inventive resins for pertechnetate ions.

TABLE 3

| Contact Time (hr) | Reillex™ HPQ (methyl) | Ex. 1 (n-butyl) | Ex. 2 (n-hexyl) | Ex. 3 (n-octyl) |
| --- | --- | --- | --- | --- |
| 0.5 | 153 | 336 | 304 | 112 |
| 2 | 214 | 595 | 588 | 237 |
| 6 | 221 | 693 | 710 | 348 |

EXAMPLE 8

The procedure of Example 7 was repeated, except using a generic Hanford Waste Complexant Concentrate Simulant instead of one specific to Tank SY-101. The results, set forth in Table 4 (Kd, mL/meq alkyl), again demonstrate the superior affinity and sorption kinetics of the inventive resins as regards the pertechnetate ion.

TABLE 4

| Contact Time (hr) | Reillex™ HPQ (methyl) | Ex. 1 (n-butyl) | Ex. 2 (n-hexyl) | Ex. 5 (isobutyl) |
| --- | --- | --- | --- | --- |
| 0.5 | 123 | 312 | 288 | 219 |
| 2 | 164 | 496 | 486 | 331 |
| 6 | 162 | 504 | 551 | 368 |

While the invention has been described in some detail in the foregoing passages, it will be understood that all additions and modifications within the spirit and scope of the invention are desired to be protected. In addition, all publications cited herein are hereby incorporated by reference as if each had been individually incorporated by reference and fully set forth.

What is claimed is:

1. An anion-exchange resin exhibiting high affinity for anions of technetium and plutonium, said resin comprising:
   a bead-form macroreticular polyvinylpyridine resin crosslinked at least about 15% with divinylbenzene, said resin having pendant pyridinyl groups of which at least 20% are 1-alkyl-pyridinium groups, wherein alkyl groups of said 1-alkyl-pyridinyl groups have from 4 to 8 carbon atoms.

2. The resin of claim 1, wherein said alkyl groups have 4 to 6 carbon atoms.

3. The resin of claim 2, wherein said alkyl groups are n-butyl, isobutyl, n-pentyl or n-hexyl.

4. The resin of claim 3, wherein, said alkyl groups are n-butyl.

5. The resin of claim 3, wherein said alkyl groups are isobutyl.

6. The resin of claim 3, wherein said alkyl groups are n-hexyl.

7. A strong base anion-exchange resin exhibiting high affinity for anions of technetium and plutonium, comprising:
   a bead form polyvinylpyridine resin crosslinked with 15% to 50% divinylbenzene, said resin bearing pendant pyridinyl groups at least about 20% of which have been alkylated with a branched or unbranched alkyl halide having 4 to 8 carbon atoms.

8. The resin of claim 7, which is a macroreticular or gel form resin.

9. The resin of claim 8, in which said pendant pyridinyl groups are 2-pyridinyl groups or 4-pyridinyl groups.

10. The resin of claim 9, in which said pendant pyridinyl groups are 4-pyridinyl groups.

11. The resin of claim 10, wherein said alkyl halide has 4 to 6 carbon atoms.

12. The resin of claim 11, wherein said alkyl halide is an alkyl chloride or alkyl bromide.

13. The resin of claim 12, wherein said alkyl halide is an alkyl chloride.

14. The resin of claim 13, wherein said alkyl halide is n-butyl chloride or n-hexyl chloride.

15. An anion-exchange resin material exhibiting high affinity for anions of technetium and plutonium, comprising:
   a 15% to 50% divinylbenzene-crosslinked, quaternized polyvinylpyridine resin, said resin having repeating units bearing pendant pyridinyl groups, wherein at least 20% of said repeating units are of the formula (I):

$$\mathrm{-(CH-CH_2)-} \quad (I)$$

(structure: pyridinium ring with $N^+$–R and counterion $X^-$)

wherein R is a branched or unbranched alkyl group having 4 to 8 carbon atoms.

16. An anion-exchange material having high affinity for plutonium and technetium anions, comprising:
   a divinylbenzene-crosslinked vinylpyridine copolymer, said copolymer being comprised about 50% to 85% by weight of pyridinyl repeating units, a portion of said pyridinyl repeating units having the formula (I):

$$\mathrm{-(CH-CH_2)-} \quad (I)$$

(structure: pyridinium ring with $N^+$–R and counterion $X^-$)

wherein R is a branched or unbranched alkyl group having 4 to 8 carbon atoms and X is an anion, and the remainder of said pyridinyl repeating units having the formula (II):

$$\mathrm{-(CH-CH_2)-} \quad (II)$$

(structure: pyridine ring with N)

or an acid salt form thereof, and wherein the mole ratio of groups (I) to (II) is at least about 1:4.

17. An anion-exchange resin having high affinity for anions of technetium and plutonium, comprising:
   a bead form, macroreticular resin formed from a copolymer of vinylpyridine and divinylbenzene, said resin having random crosslinking units, and functional repeating units consisting essentially of 20 mole % to 95 mole % pyridinium units of the formula (I):

$$\mathrm{-(CH-CH_2)-} \quad (I)$$

(structure: pyridinium ring with $N^+$–R and counterion $X^-$)

and 80% to 5% pyridinyl units of the formula (II):

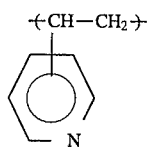 (II)

and/or acid salt forms thereof.

18. An anion-exchange resin having high affinity for anions of technetium and plutonium, comprising:

a bead-form, macroreticular resin crosslinked with at least about 15% by weight divinylbenzene, said resin being comprised at least about 20% by weight of repeating units of the formula (I):

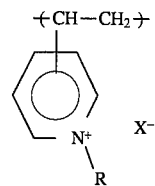 (I)

wherein R is a branched or unbranched alkyl group having 4 to 8 carbon atoms, and $X^-$ is an anion.

* * * * *